United States Patent
Creek (10) Patent No.: US 6,945,659 B2
(45) Date of Patent: Sep. 20, 2005

(54) APPARATUS FOR CONSTRUCTING A THIN FILM MIRROR

(75) Inventor: Roy Edward Creek, Newick (GB)

(73) Assignee: Seos Limited, West Sussex (GB)

( * ) Notice: Subject to any disclaimer, the term of this patent is extended or adjusted under 35 U.S.C. 154(b) by 1 day.

(21) Appl. No.: 10/601,400

(22) Filed: Jun. 23, 2003

(65) Prior Publication Data

US 2004/0264018 A1 Dec. 30, 2004

(30) Foreign Application Priority Data

Jun. 28, 2002 (GB) .............................................. 0215049

(51) Int. Cl.⁷ .......................... G02B 5/08; G02B 7/188
(52) U.S. Cl. ..................................... 359/846; 359/847
(58) Field of Search ................................ 359/846, 847, 359/848, 849, 872

(56) References Cited

U.S. PATENT DOCUMENTS

| 3,031,928 A | * | 5/1962 | Kopito ......................... 359/847 |
| 4,162,825 A | * | 7/1979 | Dowty .......................... 359/847 |
| 4,173,397 A | * | 11/1979 | Simpson ..................... 359/849 |
| 4,288,146 A | * | 9/1981 | Johnson et al. .............. 359/847 |
| 4,422,723 A | * | 12/1983 | Williams et al. ............. 359/847 |
| 4,548,482 A | * | 10/1985 | Williams et al. ............. 359/847 |
| 4,592,717 A | * | 6/1986 | Albert ......................... 425/400 |
| 4,734,557 A | | 3/1988 | Alfille et al. |
| 4,890,903 A | * | 1/1990 | Treisman et al. ............ 359/666 |
| 5,109,300 A | * | 4/1992 | Waddell ....................... 359/847 |
| 5,552,006 A | * | 9/1996 | Soliday et al. ............... 156/160 |
| 5,997,146 A | * | 12/1999 | Denham et al. ............. 359/846 |
| 6,050,692 A | * | 4/2000 | Creek .......................... 359/847 |
| 6,113,242 A | | 9/2000 | Marker et al. |
| 6,758,569 B2 | * | 7/2004 | Creek .......................... 359/846 |

FOREIGN PATENT DOCUMENTS

| DE | 372114 A1 | * | 5/1988 |
| EP | 1 176 447 A3 | | 1/2002 |
| JP | 2000326084 A | | 11/2000 |

* cited by examiner

*Primary Examiner*—Ricky D. Shafer
(74) *Attorney, Agent, or Firm*—Iandiorio & Teska (57) ABSTRACT

Apparatus (2) for constructing a thin film mirror, which apparatus (2) comprises a suction chamber (4), first attachment means (6) positioned at a first side (8) of the suction chamber (4) and for attaching the thin film (10) to the first side (8) of the suction chamber (4), and second attachment means (12) positioned at a second and opposite side (14) of the suction chamber (4) and for attaching the thin film (10) to the second side (14) of the suction chamber (4), the first and second attachment means (6, 12) being such that they secure the thin film (10) against movement when tension is applied in a first direction extending between the first and second attachment means (6, 12), and the first and second attachment means (6, 12) being such that they allow the thin film (10) to move and stretch in a second direction which is at right angles to the first direction and which allows the thin film (10) to be distorted to a desired geometric shape for forming the thin film mirror.

9 Claims, 6 Drawing Sheets

APPARATUS FOR CONSTRUCTING A THIN FILM MIRROR

FIELD OF THE INVENTION

This invention relates to apparatus for constructing a thin film mirror.

BACKGROUND OF THE INVENTION

Thin film mirrors are used to give large field of view displays in image display systems giving displays for simulation, leisure, visualisation or computer design. In the displays for simulation, the thin film mirrors are typically used as part of a collimated or near collimated off-axis display.

The geometric accuracy of the thin film mirror is a major factor in determining the quality, and hence the usefulness of such a mirror, in an image display system. The thin film mirror is manufactured on a suction chamber. The geometric accuracy of the thin film mirror is dependent on the accuracy of edges of the suction chamber, the method of application of the thin film to the edges of the suction chamber, and the deformation of the thin film when differential pressures are applied to either side of the thin film.

The thin film is initially a sheet, the shape of which is part of the frustum of a cone laid flat. The thin film is applied with no initial tension to the suction chamber. Tension in the thin film is introduced when suction or differential pressure is applied and the thin film is drawn back into the suction chamber. An ideal shape will be achieved when the tensions in the thin film are close to uniform over the entire surface. Tensions at any point in the thin film can be considered as a combination of a vertical component and a horizontal component. Vertical tensions can be seen to be uniform, since at all points around the suction chamber, the thin film transitions from a chord to an arc as the thin film is drawn back into the suction chamber. Horizontal tensions however are at a maximum in the middle of the final shape, falling to zero at the top attachment edge and the bottom attachment edge. The mechanical properties of the thin film must be considered. When the thin film is stretched beyond its yield point, the increase in force required to continue stretching significantly reduces. This means that, from the centre of the mirror moving out to the top and bottom edges, there is a large area of the mirror where the horizontal tensions are near to uniform, because the thin plastics film has been stretched beyond its yield point. In some areas of the thin film, a band at the top of the thin film and a band at the bottom of the thin film are areas where the thin film has not been stretched to its yield point, as the horizontal tension reduced rapidly towards the top edge and towards the bottom edge. This lack of tension in the thin film close to and parallel to the top and bottom forming edges of the suction chamber, allows the thin film to move back, under vacuum, substantially more than the ideal vertical profile required. The result is a flatter/longer vertical radius in the central part of the mirror that transitions to a sharper/shorter radius closer to the top and bottom edges. The geometry of the thin film when under tension therefore does not match the desired geometry in the region close to the top of the thin film and in the region close to the bottom of the thin film. These areas introduce unacceptable distortions into any image and are usually masked. These unusable regions are known as dead bands.

SUMMARY OF THE INVENTION

It is an aim of the present invention to obviate or reduce the above mentioned problem.

Accordingly, the present invention provides apparatus for constructing a thin film mirror, which apparatus comprises a suction chamber, first attachment means positioned at a first side of the suction chamber and for attaching the thin film to the first side of the suction chamber, and a second attachment means positioned at a second and opposite side of the suction chamber and for attaching the thin film to the second side of the suction chamber, characterised in that the first and second attachment means are such that they secure the thin film against movement when tension is applied in a first direction extending between the first and second attachment means; the first and second attachment means are such that they allow the thin film to move and stretch in a second direction which is at right angles to the first direction and which allows the thin film to be distorted to a desired geometric shape for forming the thin film mirror; the first attachment means comprises a flexible retaining strip, and an attachment member which has first and second ends, the first end being such that it passes partially around the flexible retaining strip, and the second end being such that it is secured to the suction chamber: and the second attachment means comprises a flexible retaining strip, and an attachment member which has first and second ends, the first end being such that it passes partially around the flexible retaining strip, and the second end being such that is secured to the suction chamber.

The apparatus of the present invention is able to produce a thin film mirror with improved geometric accuracy as compared with previously known thin film mirrors. More specifically, the apparatus of the present invention is able to reduce significantly the dead bands at the top and bottom edges, and to such an extent that they may be almost entirely eliminated. The apparatus of the present invention can be used to improve the geometric accuracy of thin film mirrors of various shapes. Thus, for example, the thin film mirrors can be spherical, spheroidal, toroidal, or of a shape that is curved in two planes.

The apparatus of the invention may include first adjustment means positioned at a third side of the suction chamber, and second adjustment means positioned at a fourth and opposite side of the suction chamber, the first and second adjustment means being for stretching the thin film in the second direction.

The first adjustment means may comprise a clamping device for clamping the thin film, and tensioner means for applying a tension to the thin film in order to stretch the thin film in the second direction.

The second adjustment means may comprise a clamping device for clamping the thin film, and tensioner means for applying a tension to the thin film in order to stretch the thin film in the second direction.

Usually, the first and second adjustment means will be of the same construction but they may be of different constructions if desired.

The apparatus of the invention may be one in which the first side of the suction chamber is an upper side, in which the second side of the suction chamber is a lower side, in which the first direction in which the tension is applied is then a vertical direction, and in which the second direction in which the tension is applied is then a horizontal direction.

Preferably, the first attachment means is such that the flexible retaining strip is of a circular cross section, and in which the first end of the attachment member is concave and the second end of the attachment member is straight. The flexible retaining member may be of other cross sectional shapes if desired. Usually, the first end of the attachment member will follow the outside profile of the flexible retaining strip.

Advantageously, the first attachment means also comprises adhesive means which secures the thin film around the flexible retaining strip and to itself. The adhesive means may be double sided adhesive tape, single sided adhesive tape, or an adhesive on its own.

Preferably, the second attachment means is such that the flexible retaining strip of the second attachment means is of a circular cross section, and in which the first end of the attachment member of the second attachment means is concave, and the second end of the attachment member is straight. The flexible retaining strip may be of other cross sectional shapes if desired. Generally, the first end of the attachment member will follow the profile of the flexible retaining strip.

Usually, the first and second attachment means will be of the same construction, but they may be of a different construction if desired.

The thin film used for making the thin film mirror is preferably made of aluminised polyethylene terephthalate. Other suitable and appropriate plastics materials can be used if desired.

BRIEF DESCRIPTION OF THE DRAWINGS

An embodiment of the invention will now be described solely by way of example and with reference to the accompanying drawings in which.

DETAILED DESCRIPTION OF THE DRAWINGS

Figure 1:
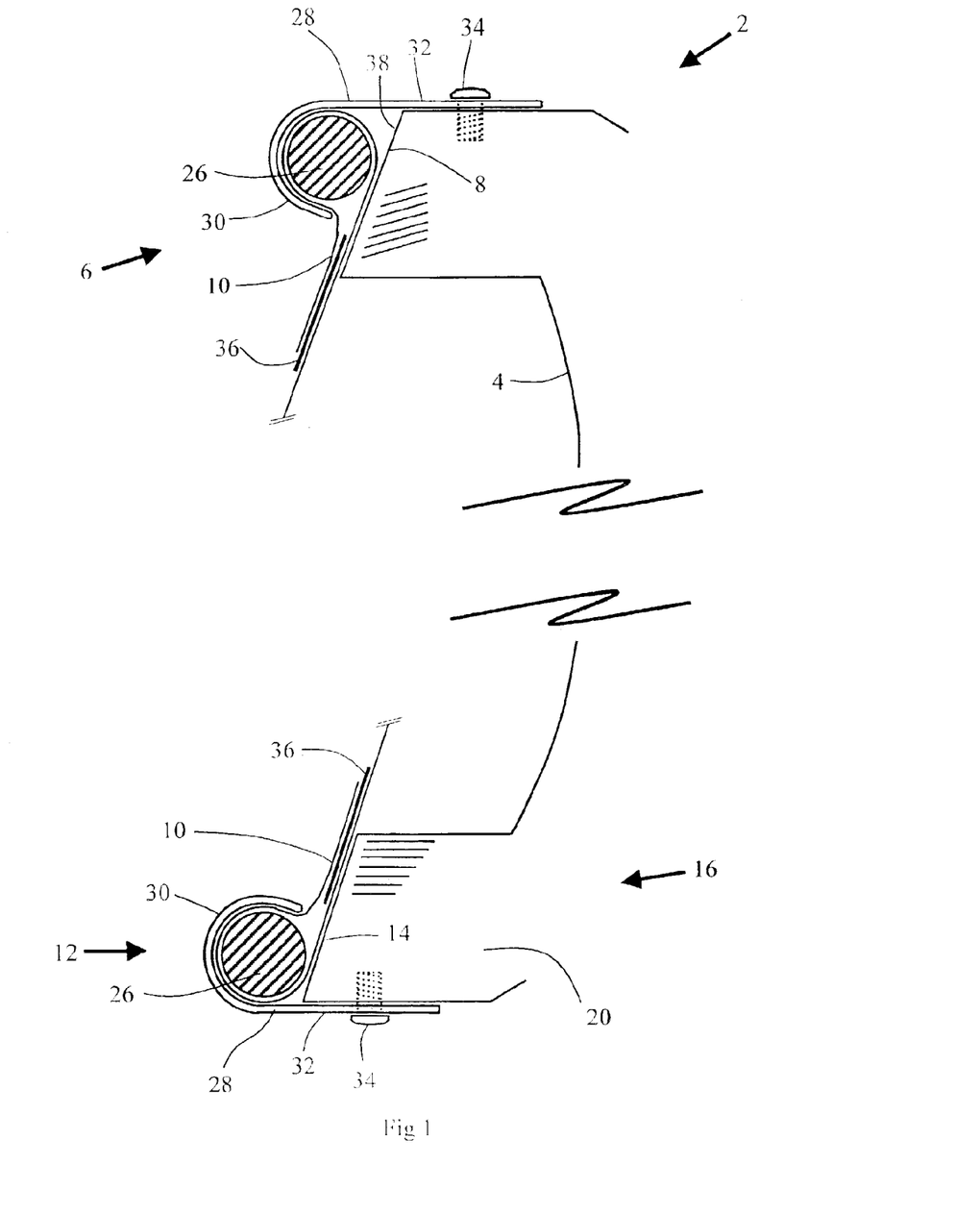
FIG. 1 is a cross section through part of apparatus for constructing a thin film mirror.

Referring to FIG. 1, there is shown apparatus 2 for constructing a thin film mirror. The apparatus 2 comprises a suction chamber 4. First attachment means 6 is positioned at a first side 8 of the suction chamber 4. The first attachment means 6 is for attaching thin film 10 to the first side 8 of the suction chamber 4. Second attachment means 12 is positioned at a second and opposite side 14 of the suction chamber 4. The second attachment means 12 is for attaching the thin film 10 to the second side 14 of the suction chamber 4.

The first and second attachment means 6, 12 are such that they secure the thin film against movement when tension is applied in a first direction extending between the first and second attachment means 6, 12. The first and second attachment means 6, 12 are also such that they allow the thin film to move and stretch in a second direction which is at right angles to the first direction, and which allows the thin film 10 to be distorted to a desired geometric shape for forming the thin film mirror.

Figure 3:
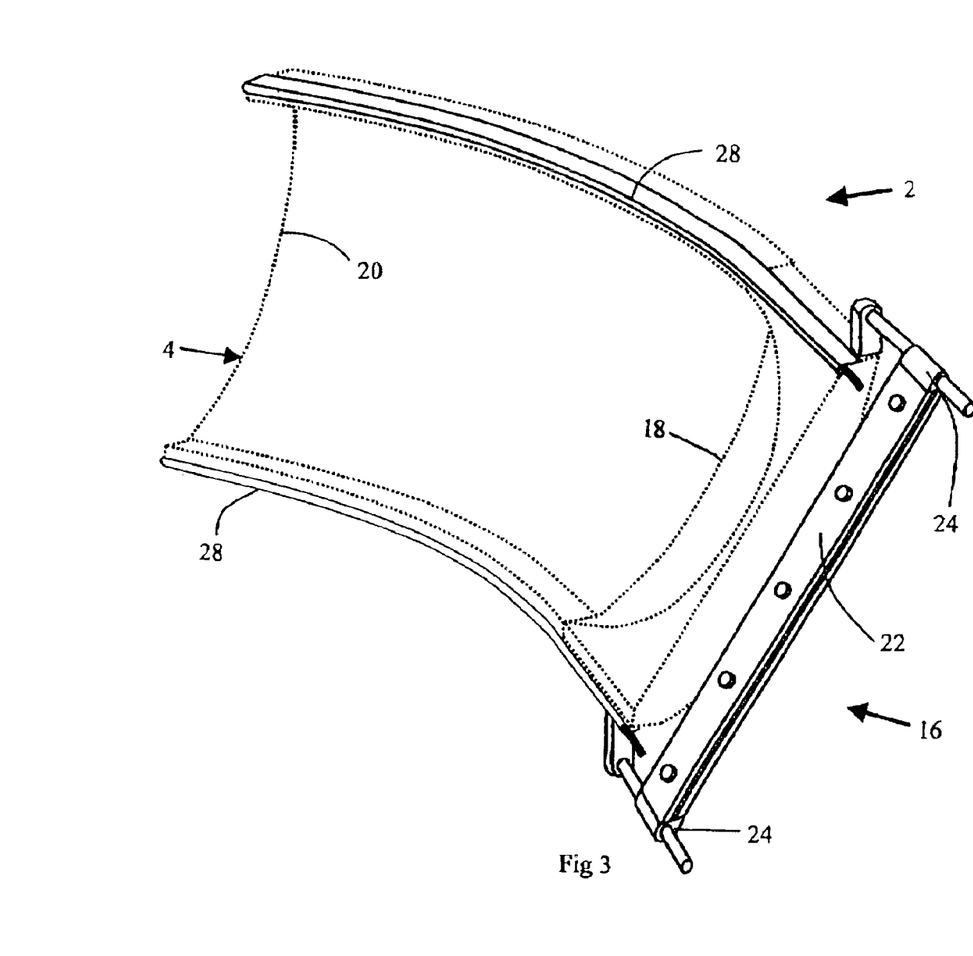
FIG. 3 is a view like FIG. 2 but shows additional parts of the apparatus for constructing the thin film mirror.

As shown in FIG. 3, the apparatus 2 includes first adjustment means 16 positioned at a third side 18 of the suction chamber 4. Second adjustment means (not shown) is positioned at a fourth and opposite side 20 of the suction chamber 4. The second adjustment means which is not shown is of the same construction as the first adjustment means 16. The first adjustment means 16 and the second adjustment means are for stretching the thin film 10 in the second direction.

As shown in FIG. 3, the first adjustment means 16 comprises a clamping device 22 for clamping the thin film 10, and tensioner means 24 for applying a tension to the thin film 10 in order to stretch the thin film 10 in the second direction.

Figure 2:
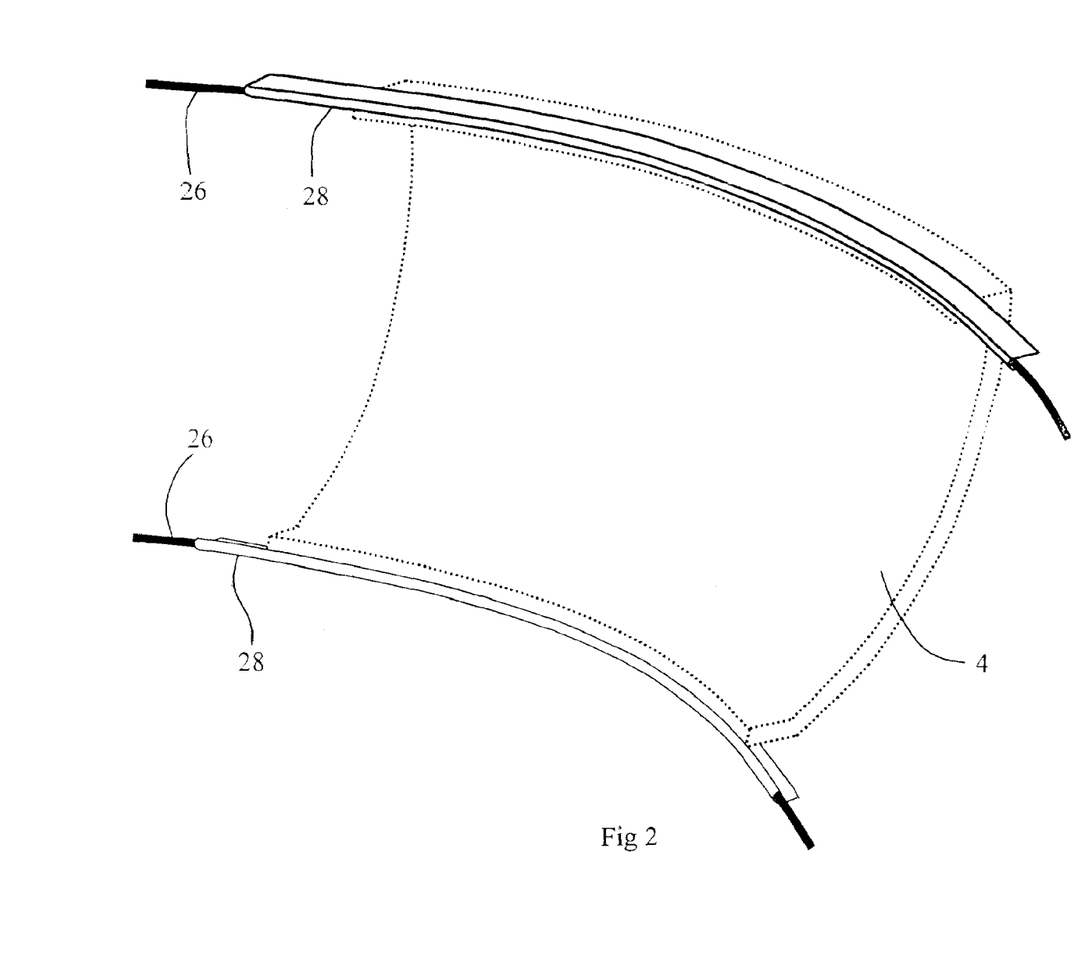
FIG. 2 is a perspective view of the part of the apparatus shown in FIG. 1.

As can be appreciated from FIGS. 1 and 2, the first side 8 of the suction chamber 4 is an upper side, and the second side 14 of the suction chamber 4 is a lower side. Thus the first direction in which the tension is applied to the thin film 10 is a vertical direction. The second direction in which the tension is applied to the thin film 10 is then a horizontal direction.

As best appreciated from FIG. 1, the first and the second attachment means 6, 12 are of the same construction. More specifically, the first and the second attachment means 6, 12 each comprise a flexible retaining strip 26 and an attachment member 28. The attachment member 28 has a first end 30 and a second end 32. The first end 30 is such that it passes partially around the flexible retaining strip 26. The second end 32 is such that it is secured by a screw 34 to the suction chamber 4. The flexible retaining strip 26 is of a circular cross section as shown, and the first end 30 of the attachment member 28 is concave. The second end 32 of the attachment member 28 is straight.

The first and second attachment means 6, 12 also each include adhesive means in the form of double sided adhesive tape 36. The double sided adhesive tape 36 secures the thin film 10 around the flexible retaining strip 26 and to itself.

The flexible retaining strip 26 is made of a rubber material but it may be made of other materials if desired.

Figure 4:
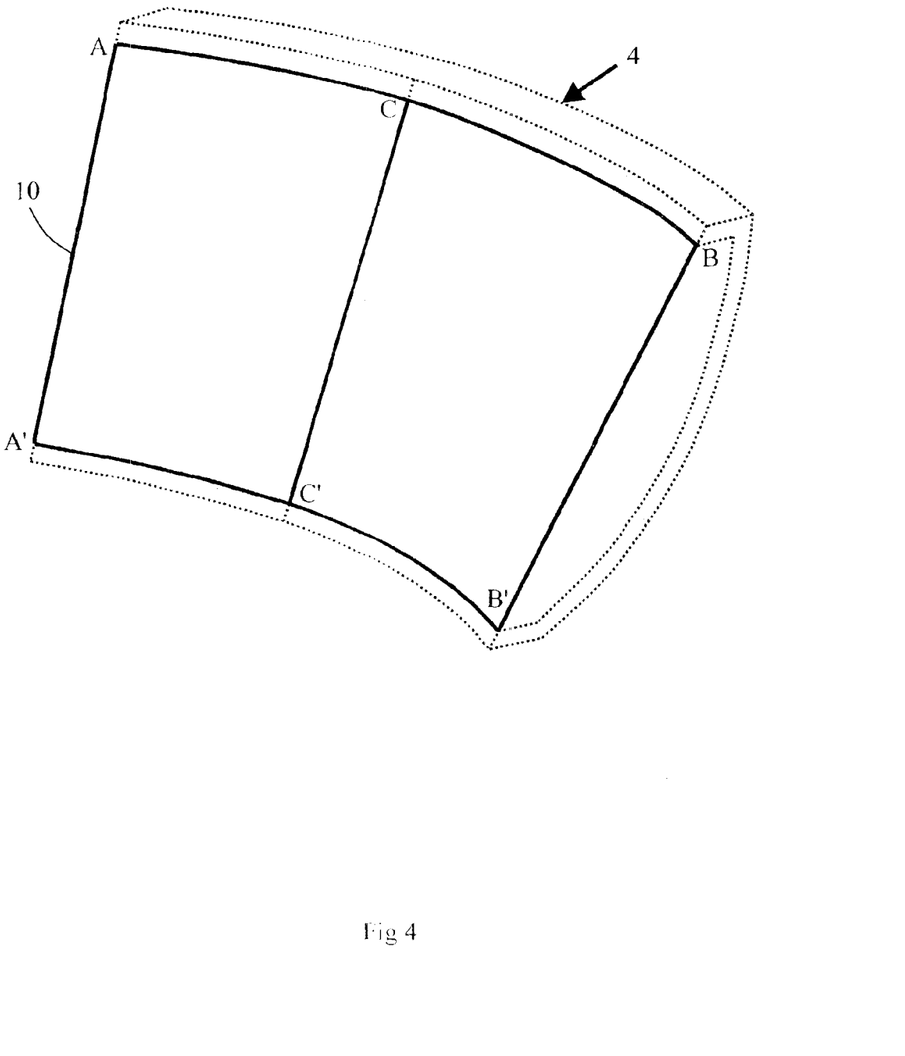
FIG. 4 shows a segment of a suction chamber used in the apparatus shown in FIG. 1 and the geometry of thin film that has been positioned without any tension.

Referring to FIG. 4, there is shown a segment of the suction chamber 4 with the thin film 10 in position. The thin film 10 has been applied without any tension. For simplicity of illustration, the attachment means employed have not been shown. The top edge of the thin film 10 follows an arc ACB. The bottom edge of the thin film 10 follows an arc A'C'B'. The shape of the thin film 10 can be described as being part of the surface of the frustum of a cone.

Figure 5:
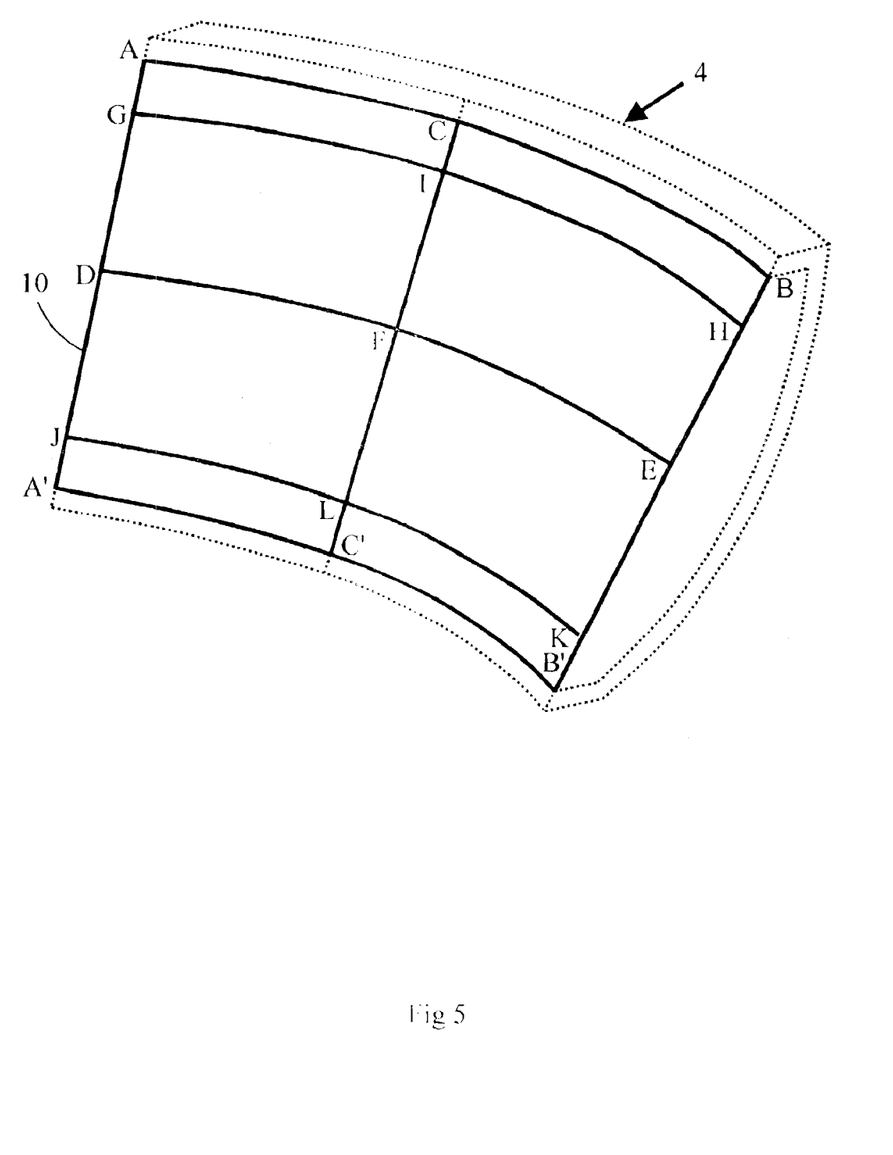
FIG. 5 is like FIG. 4 but shows the segment of the suction chamber and the geometry of the thin film that has been positioned without any tension, with horizontal arcs marked.

FIG. 5 shows a segment of the suction chamber 4, with the thin film 10 in position. The thin film 10 has been applied without tension. No distortion has been applied to the thin film 10. The geometry of the thin film 10, which is part of the surface of a frustrum of a cone, has surface arcs ACB, GIH, DFE, JLK and A'C'B'. The arcs are at different horizontal positions on the thin film 10.

Figure 6:
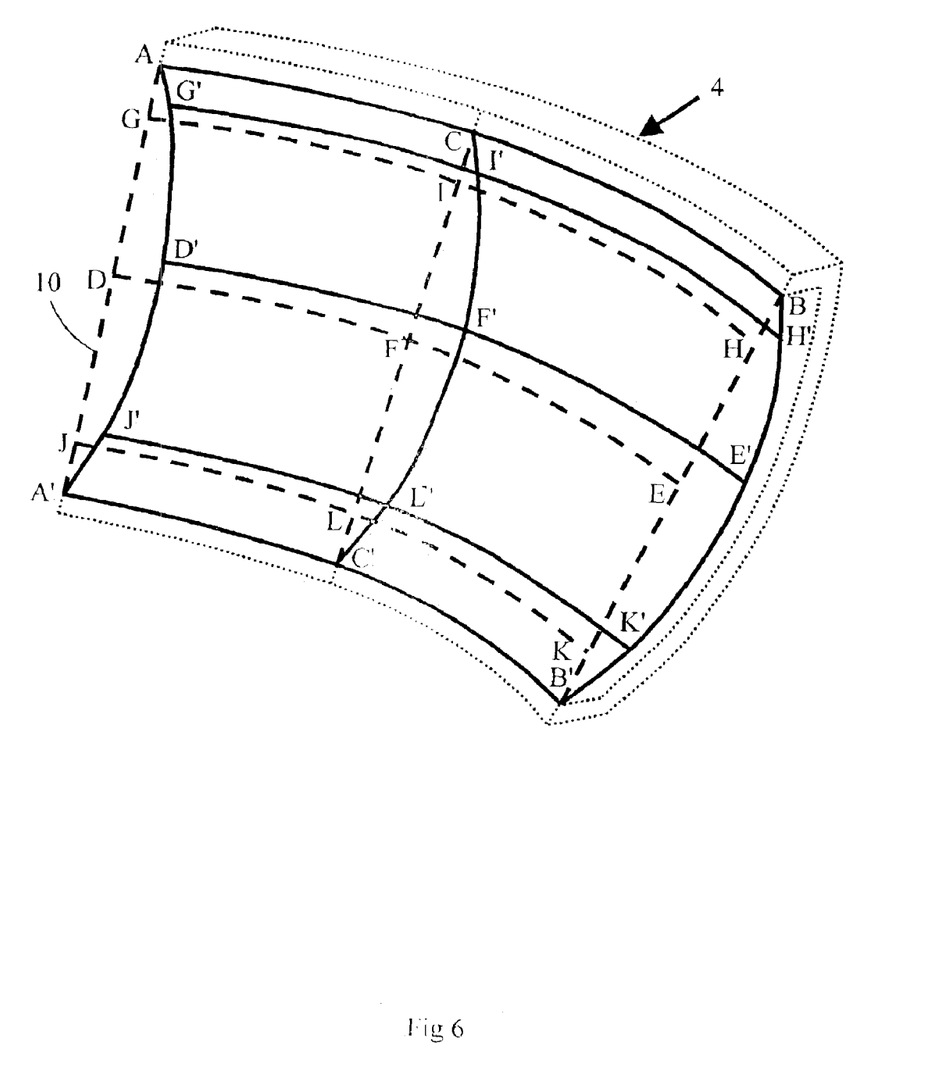
FIG. 6 is like FIG. 5 and shows the segment of the suction chamber, and the relative geometry of the thin film after suction has been applied.

FIG. 6 shows a segment of the suction chamber 4. The points shown indicate the position of the thin film 10 after the thin film 10 has undergone distortion by differential pressure or suction. Considering the distortion in the vertical direction, chord AA' distorts to become arc AD'A', chord CC' distorts to become arc CF'C', and chord BB' distorts to become arc BE'B'. The vertical tensions are uniform across the thin film 10. Considering the horizontal tensions, the top edge of the thin film ACB remains unchanged. The bottom edge of the thin film A'B'C' remains unchanged. The horizontal arc GIH under distortion becomes arc G'I'H', arc DFE become D'F'E' and arc JLK becomes J'L'K'. This shows the variation in horizontal tension. This tension is at a maximum in the middle of the thin film, along arc D'F'E' reducing to zero at the top edge ACB and to zero at the bottom edge A'C'B'. As the horizontal tension in the thin film reduces towards the top edge and towards the bottom edge, there are points where the tension reduces to a level that is less than the yield point of the material of the thin film 10. The top region of the thin film 10 which does not reach yield point is indicated by the area ACBH'I'G', and the bottom region of the thin film that does not reach yield point is indicated by the area A'C'B'K'L'J. It is these areas that do not distort to the desired geometry that introduce distortion into the image. These areas are known as dead bands and are often masked, reducing the effective usable proportion of the thin film mirror. With the present invention, the vertical size of these dead bands is significantly reduced. The area ACBH'I'G' and the area A'C'B'K'L'J' are reduced in size and the usable portion of the mirror is greatly increased.

As can best be seen from FIG. 1, the thin film 10 is passed around the flexible retaining strip 26. The flexible retaining strip 26 is substantially longer in length than the top edge of the suction chamber 4. The second end 32 of the attachment member 28 is fixed at regular intervals along the suction chamber 4. There is a gap between the first end 30 and the front face 38 of the suction chamber 4. This gap is large enough to allow the thin film 10, which is adhered to itself by the tape 36, to pass through the first and second attachment means 6, 12 hold the thin film 10 in position against the top and bottom edges of the suction chamber 4 without any initial tension.

The flexible retaining strip 26 is unable to pass between the first end 30 of the attachment member 28 and the front 38 of the suction chamber 4. The top and bottom edges of the thin film 10 are therefore unable to move vertically when tension is applied to the thin film 10 by the action of differential pressure. However, the flexible retaining strip 6 fits inside the first end 30 with some tolerance, thus enabling the thin film 10 to move laterally with respect to the first end 30 when horizontal tension is applied. Therefore, prior to applying differential pressures to the sides of the thin film 10, it is possible to apply horizontal tension to the thin film 10 by stretching the thin film 10 in a horizontal direction by the first adjustment means 16 shown in FIG. 3 and the second adjustment means. Film 10 can be stretched at either the left end or its right end, or by equal or different amounts, simultaneously at both ends. If stretching at only one end is required, then only one of the adjustment means needs to be employed.

With the apparatus of the present invention, tension can be applied to the thin film 10 in very precise and measured ways. It is possible to calculate and vary the applied tension according to variables such as the type of material employed for the thin film 10, the material thickness, or the temperature of the material. Other variables may also be considered. The use of the mechanical means to apply the tension to the thin film 10 also allows the top of the thin film 10 to be tensioned by a different amount than the bottom of the thin film 10. More tension can be applied to the top edge or less tension can be applied to the top edge, as may be desired.

The above mentioned stretching of the thin film 10 and applying horizontal tension to the thin film 10 before the thin film 10 is distorted by different pressure or suction, improves the geometry of the thin film 10 as mentioned above. This is especially important when the apparatus is used to make large curved mirrors for use in collimated displays used in the simulation industry.

It is to be appreciated that the embodiment of the invention described above with reference to the accompanying drawings has been given by way of example only and that modifications may be effected. Thus, for example, the adjustment means for applying the horizontal tension to the thin film 10 may be a manual means, or a mechanical means such for example as a hydraulic, pneumatic or other mechanical means. The same tension may be applied to the top and bottom edge of the thin film 10, or the tension may be applied such that it is different at the top edge than at the bottom edge. The tension may also be applied to an extent that is less than the yield point of the material of the thin film, to an extent that is at the yield point of the material of the thin film, or to an extent that is beyond the yield point of the material of the thin film 10. The apparatus of the present invention can be used with known suction chambers used for forming thin film mirrors, and it is also suitable for use with additional end attachments of varying shapes and designs that are used to assist in the forming of thin film mirrors. Other cross sectional shapes for the flexible retaining strip 26 and the attachment means 28 may be employed. Single sided adhesive tape or just adhesive on its own may be used instead of the double sided adhesive tape 36. The apparatus of the present invention may be used to form mirrors curved in two planes. The produced mirrors may have a spherical geometry, a spheroidal geometry or a toroidal geometry.

What is claimed is:

1. Apparatus for constructing a thin film mirror, which apparatus comprises a suction chamber, first attachment means positioned at a first side of the suction chamber and for attaching the thin film to the first side of the suction chamber, and second attachment means positioned at a second and opposite side of the suction chamber and for attaching the thin film to the second side of the suction chamber, characterised in that the first and second attachment means are such that they secure the thin film against movement when tension is applied in a first direction extending between the first and second attachment means; the first and second attachment means are such that they allow the thin film to move and stretch in a second direction which is at right angles to the first direction and which allows the thin film to be distorted to a desired geometric shape for forming the thin film mirror; the first attachment means comprises a flexible retaining strip, and an attachment member which has first and second ends, the first end being such that it passes partially around the flexible retaining strip, and the second end being such that it is secured to the suction chamber; and the second attachment means comprises a flexible retaining strip, and an attachment member which has first and second ends, the first end being such that it passes partially around the flexible retaining strip, and the second end being such that it is secured to the suction chamber.

2. Apparatus according to claim 1 and including first adjustment means positioned at a third side of the suction chamber, and second adjustment means positioned at a fourth and opposite side of the suction chamber, the first and second adjustment means being for stretching the thin film in the second direction.

3. Apparatus according to claim 2 in which the first adjustment means comprises a clamping device for clamping the thin film, and tensioner means for applying a tension to the thin film in order to stretch the thin film in the second direction.

4. Apparatus according to claim 2 in which the second adjustment means comprises a clamping device for clamping the thin film, and tensioner means for applying a tension to the thin film in order to stretch the thin film in the second direction.

5. Apparatus according to claim 1 in which the first side of the suction chamber is an upper side, in which the second side of the suction chamber is a lower side, in which the first direction in which the tension is applied is then a vertical direction, and in which the second direction in which the tension is applied is then a horizontal direction.

6. Apparatus according to claim 1 in which the flexible retaining strip of the first attachment means is of a circular cross section, in which the first end of the attachment member of the first attachment means is concave, and in which the second end of the attachment member of the first attachment means is straight.

7. Apparatus according to claim 1 in which the first attachment means also comprises adhesive means which secures the thin film around the flexible retaining strip and to itself.

8. Apparatus according to claim 1 in which the flexible retaining strip of the second attachment means is of a circular cross section, in which the first end of the attachment member of the second attachment means is concave, and in which the second end of the attachment member of the second attachment means is straight.

9. Apparatus according to claim 1 in which the second attachment means also comprises adhesive means which secures the thin film around the flexible retaining strip and to itself.

* * * * *